United States Patent [19]

Taylor

[11] 4,027,947

[45] June 7, 1977

[54] OPTICAL DEVICE FOR PROVIDING A THREE DIMENSIONAL VIEW OF A TWO DIMENSIONAL IMAGE

[76] Inventor: Leonard J. Taylor, R.D. No. 2, Box 824, Chester, N.J. 07930

[22] Filed: Dec. 12, 1975

[21] Appl. No.: 640,068

[52] U.S. Cl. .............................. 350/144; 350/133
[51] Int. Cl.² ...................................... G02B 27/22
[58] Field of Search .......... 350/133, 137, 139, 143, 350/144, 145

[56] References Cited

UNITED STATES PATENTS

| | | | |
|---|---|---|---|
| 1,850,153 | 3/1932 | Paroselli | 350/137 |
| 2,088,041 | 7/1937 | Smith | 350/144 |
| 2,297,322 | 9/1942 | Rasco | 350/144 |

Primary Examiner—John K. Corbin
Assistant Examiner—Matthew W. Koren
Attorney, Agent, or Firm—Daniel H. Bobis

[57] ABSTRACT

An optical device for providing a three dimensional view of a two dimensional image therein has a holder for pivotally supporting coacting right and left viewing conduits each respectively in communication at one end with the two dimensional image and at the opposite ends the right viewing conduit having a right eye viewing member and the left viewing conduit having a left eye viewing member, and said right and left viewing conduits having therein coacting optical systems which act to split the two dimensional image and to pass one split image from the right conduit to the left eye viewing member on the left viewing conduit, and the other split image from the left viewing conduit to the right eye viewing member so that when the images are viewed binocularly they will give a three dimensional optical effect, an adjusting device is provided to adjust the right and left viewing conduits towards and away from each other to position the respective right eye and left eye viewing members in accordance with the spaced distance between the eyes of the user of the device, and the right eye and left eye viewing members are adjustable to sharpen the focus of the viewed split images.

5 Claims, 11 Drawing Figures

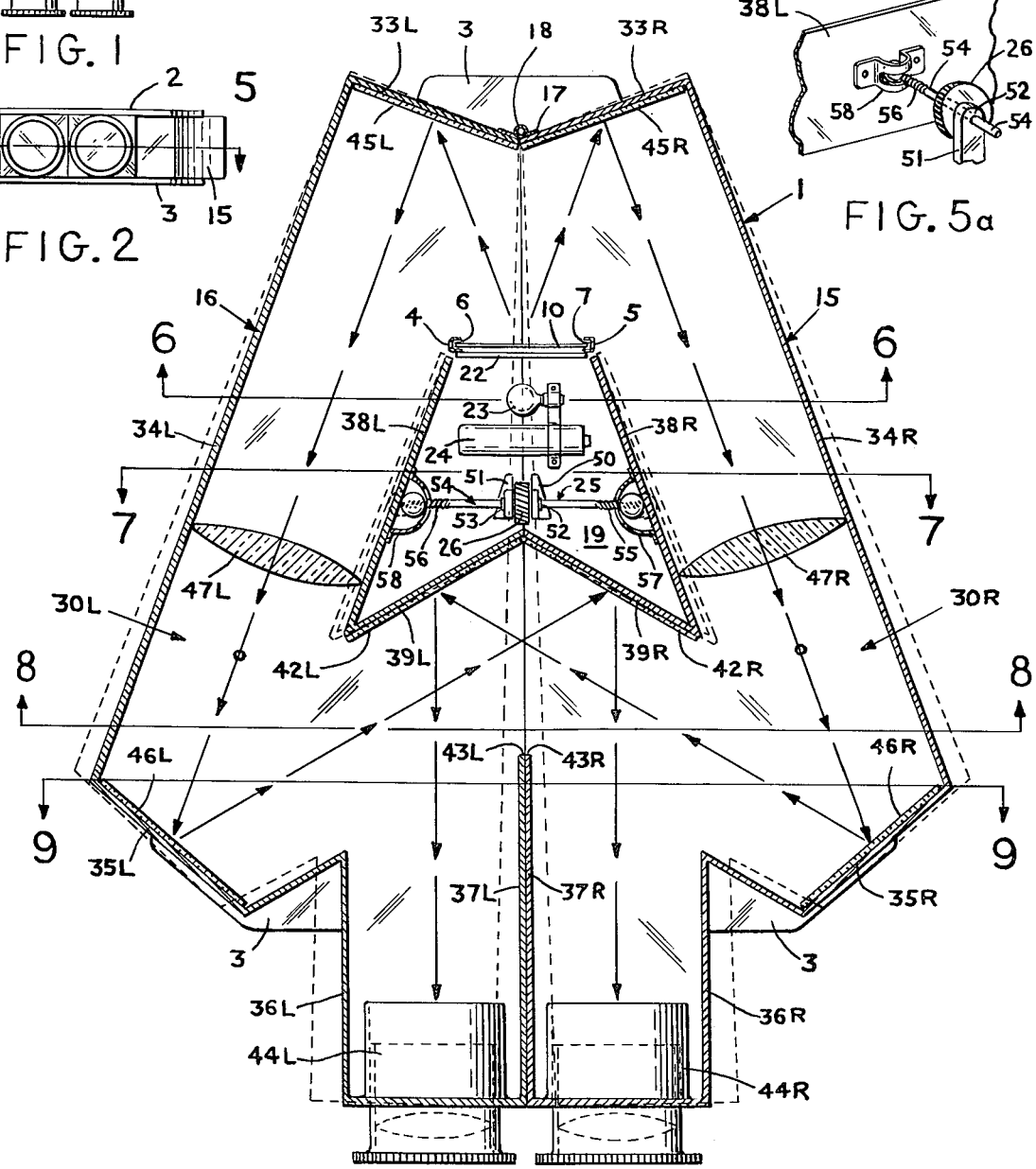

OPTICAL DEVICE FOR PROVIDING A THREE DIMENSIONAL VIEW OF A TWO DIMENSIONAL IMAGE

BACKGROUND OF THE INVENTION

This invention relates generally to optical viewing devices and more particularly to an optical device for providing a three dimensional view of a two dimensional image.

It is desirable for many reasons to be able to observe an image or picture in three dimensional form.

Stereopticons are old and well known optical viewing devices for accomplishing this purpose.

Such devices have been generally characterized by the use of two specially prepared images which are projected for binocular viewing so the resolution of the images by the eyes of the viewer produce a single three dimensional image of the two pictures.

With the advent of slides and other photographic data where only a single image is provided various devices have been developed to convert the single image by some form of optical system so that the viewer will see the image in three dimensional effect.

Such prior art devices are shown in U.S. Pats. 2,084,795; 2,297,322; 2,337,139, and 3,516,725.

In U.S. Pat. 2,297,322 a mirror system is utilized to split the two dimensional image and to direct one split image to the right eye of the viewer and the other split image to the left eye of the viewer so that when the eyes of the viewer resolve the respective split images, the image will appear in three dimensional form.

The optical device in accordance with the present invention seeks to accomplish the same end result in that it takes a single two dimensional image and by means of a device which utilizes the coaction between a plurality of mirrors and optical devices achieves the same end of splitting the single image into two separate images so that when the separate images or split images are transmitted they will be viewed or projected in three dimensional form.

Additionally the optical device in accordance with the present invention provides means for adjusting the viewing conduits for differences in the distance between the eyes of different people when the device in accordance with the present invention is in the form of an optical viewer.

SUMMARY OF THE INVENTION

Thus, the present invention covers an optical device for viewing a two dimensional image in three dimensional form having a holder, a right viewing conduit and a left viewing conduit pivotally connected in said holder to permit movement towards and away from each other, an image receiving means on said holder for a two dimensional image disposed for operative association with the right viewing conduit and left viewing conduit, said right viewing conduit and left viewing conduit each respectively having an opening adjacent one end in communication with the two dimensional image receiving means, a right eye viewing member on said right viewing conduit and a left eye viewing member on said left viewing conduit at the respective ends remote from the end in communication with the two dimensional image receiving means, said right viewing conduit and left viewing conduit respectively having a cross-over opening inwardly of the right eye viewing member and left eye viewing member thereon, coacting mirrors and optical means in the respective right and left viewing conduits operatively associated with the end openings to provide split images of the two dimensional image in the image receiving means and for passing through each respective cross-over opening one of said split images to the right eye viewing member and the other of said images to the left eye viewing member so that the images will be viewed in three dimensions, and means for adjustably positioning the right viewing conduit and the left viewing conduit as may be required for different distances between the eyes.

Other objects and advantages of the invention will be set forth in the following description and claims and will be illustrated in the accompanying drawings which disclose by way of example the principles of the invention and the best mode thereof;

Thus in the drawings:

FIG. 1 is a top plan view of an optical device in accordance with the present invention.

FIG. 2 is a front view of the optical device shown in FIG. 1.

FIG. 3 is a side view of the optical device shown in FIG. 1.

FIG. 4 is a back view of the optical device shown in FIG. 1.

FIG. 5 is a horizontal section through the optical device shown in FIGS. 1 to 4 taken on line 5–5 of FIG. 2 with the viewing conduits expanded laterally as shown by the phantomized lines.

FIG. 5a is a fragmentary front view of the inner wall on the left viewing conduit showing the bracket assembly for the turnscrew adjusting assembly.

Figure 6:
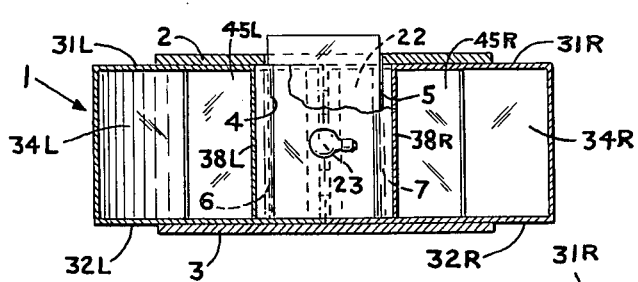
FIG. 6 is a vertical section taken on line 6–6 of FIG. 5.
Figure 7:
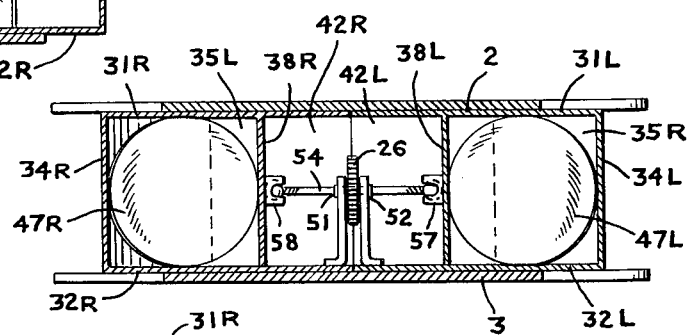
FIG. 7 is a vertical section taken on line 7–7 of FIG. 5.
Figure 8:
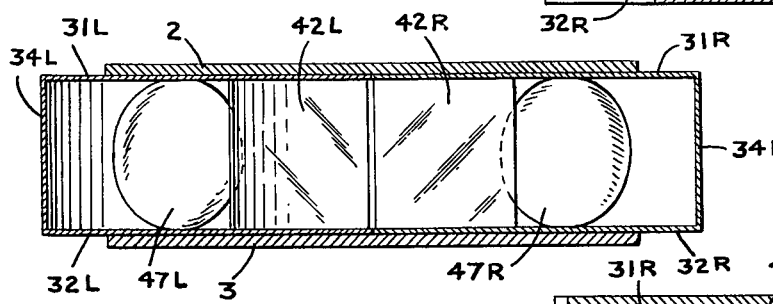
FIG. 8 is a vertical section taken on line 8–8 of FIG. 5.

Referring to the drawings the Figures show an optical device in accordance with the present invention in the form of an optical viewer having a main frame or holder generally designated 1 which includes an upper support plate 2 and a lower support plate 3 which are relatively thin flat members and have substantially the same elongated truncated triangular shape in plane view.

The upper support plate 2 and lower support plate 3 are held in predetermined spaced relation to each other by medially disposed support studs or guides 4 and 5.

The support guides 4 and 5 are disposed on opposite sides of the longitudinal center line of the main frame or holder 1 in predetermined spaced relation to each other so that slide grooves 6 and 7 therein which open as at 8 and 9 on the upper surface of the upper support plate 2 to communicate with an image receiving means 10 for slides, frames or other two dimensional image holding devices of standard size such as 2" X2" photographic slide. Further the photographic slides or other image holding devices will fit snugly in the slide grooves 6 and 7 and will fill the space between the image supporting studs or guides 4 and 5 transverse or normal to the longitudinal center line of the main frame or holder 1.

The predetermined spaced distance between the upper support plate 2 and lower support plate 2 will thus be a function of the slide frame or image holder which fits between the image support guides 4 and 5.

In the space between the upper support plate 2 and lower support plate 3 of the main frame or holder 1 are a right image viewing conduit 15 and a left image viewing conduit 16 which are connected to each other at one end by a hinged member 17 which hinge member in turn is fixedly connected by a pivot pin 18 to the respective upper support plate 2 and lower support plate 3 in the longitudinal center line of the main frame or holder 1 inwardly of the respective ends thereof.

The right image viewing conduit 15 and left viewing conduit 16 are so constructed as hereinafter described that they respectively lie along the longitudinal center line of the main frame or holder 1 but on opposite sides thereof so that they may be moved bilaterally towards and away from each other by pivoting about the pivot pin 18 to adjust the distance between the respective ends of the right image viewing conduit and left image viewing conduit remote from the pivot pin 18 for reasons that will appear clear from the description regarding the use of the viewer below.

Further however it will be noted that the respective right and left image viewing conduits 15 and 16 are so shaped that they form when in assembled position in the main frame or holder 1, an irregularly shaped chamber generally designated 19 which has the image holding supports or guides 5 and 6 at one end. Thus when a photographic slide or other type of frame or image holder is in assembled position it forms the rear or back wall of the chamber 19 as is clearly shown in FIGS. 1, 5 and 6 of the drawings. This chamber 19 is accessible through an opening 20 formed in the upper plate 2 which is closed by suitable closure means 21.

Mounted on or affixed to the lower support plate 3 within the space defined by the chamber 19 are a light diffuser 22, light means 23, a battery 24, and a turn screw adjusting assembly 25.

The light and battery will be operatively connected to a switch, not shown, by means of a conventional series circuit which lighting circuits are so well known in optical viewing devices that they require no further description herein.

As is shown in FIG. 6 the light lies so that it is projected through the light diffuser and through the image which is mounted between the image support guides 4 and 5. It will be obvious to those skilled in the art that if a non-transparent image is placed in the image receiving means formed by the slide grooves 6 and 7 that the light source will have to be provided on the opposite side of the image receiving means.

The turnscrew adjusting assembly 25 has a knurled knob 26 in the center thereof which lies substantially in the centerline of the main frame or holder 1 and extends through an opening 27 in the cover 21 for the opening 20 in the upper support plate 2 of the main housing 1. The manner in which the turnscrew adjusting assembly 25 is connected to the main housing 1, and to the right and left viewing conduits 15 and 16 for moving the same towards and away from each other is more fully set forth after the description of the image viewing conduits which now follows.

IMAGE VIEWING CONDUITS

Normally a single image is seen in only two dimensions namely width and height. The third dimension depth is lacking.

Depth however can be achieved if the two dimensional image is split into two images which differ from each other only as to angular planes thereof and provided means for binocular viewing of these images is provided.

In the optical viewer in accordance with the present invention this is accomplished by the operatively associated right image viewing conduit 15 and left image viewing conduit 16 wherein a combined mirror and optical system act to split the image and from the right image viewing conduit one split image is passed to the left eye and from the left image viewing conduit the other split image is passed to the right eye.

Figure 10:
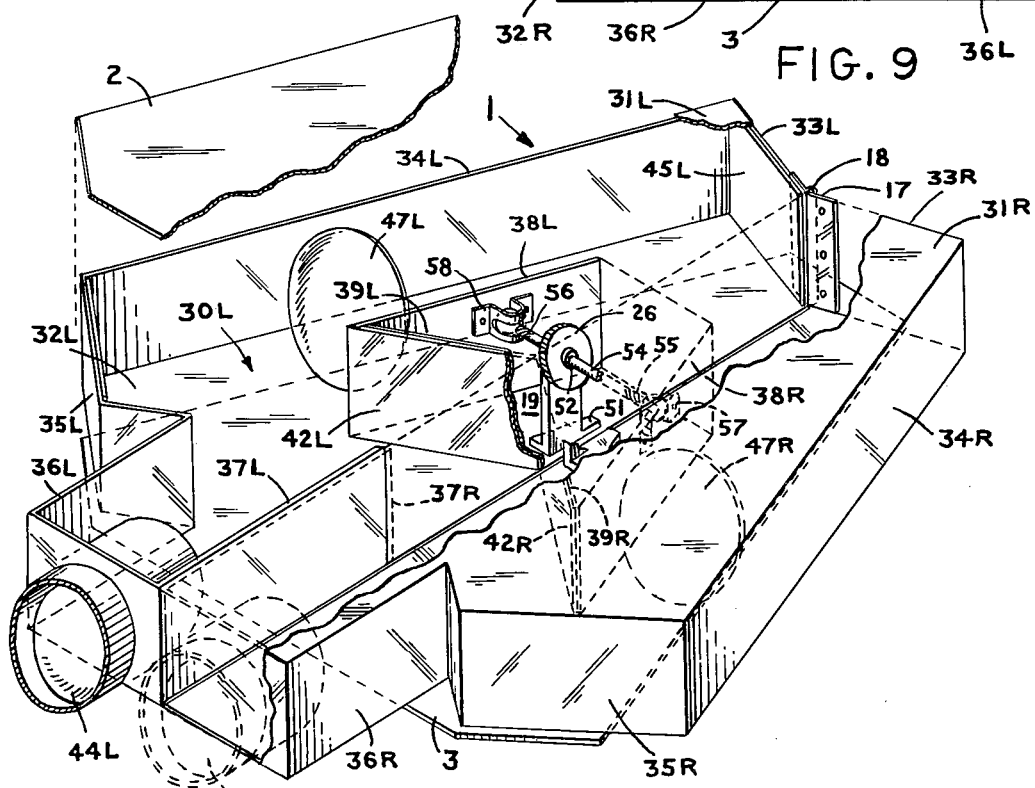
FIG. 10 is an exploded perspective view of the optical device shown in FIGS. 1 to 9.

By reference to FIGS. 1, 5 and 10 it will be clear that the respective right image viewing conduit or housing 15 and left image viewing conduit or housing 16 are not only bilaterally disposed with respect to the longitudinal center lin but further are mirror images of each other.

As a result of this bilateral symmetry and mirror image relation the same parts on the respective right image viewing conduit 15 and left image viewing conduit 16 will be substantially identical to each other. Therefore, in the description which follows such parts and elements will be given the same character numeral but will be distinguished with character Letters R for the elements of the right image viewing conduit and L for the elements of the left image viewing conduit.

Thus, referring to FIGS. 5 to 10 the right and left image viewing conduits or housing 15 and 16 are shown as having an elongated box like construction defining zig-zap or generally Z-shaped image transmitting chambers generally designated 30R and 30L.

The right and left image viewing conduits or housing 15 and 16 include a top or upper member 31R and 31L and a bottom or lower member 32R and 32L which members are held in spaced relation by associated back walls 33R and 33L, outerside walls 34R and 34L, angled front wall 35R and 35L and U-shaped front wall 36R and 36L.

Short inner stop and shield sections 37R and 37L form part of the U-shaped front wall 36R and 36L and these sections lie respectively in abutting relation to each other along the longitudinal centerline of the main frame or housing 1 when the right and left viewing image viewing conduits are in the closed position as shown in FIGS. 1, 5 and 6 to 10 of the drawings.

Inner partitions 38R and 38L connect in the main frame or housing 1 medially of the bottom member 32R and 32L at an angle to the longitudinal line of the stop and shield sections 37R and 37L and respectively parallel to their associated outside walls 34R and 34L.

Similarly, mirror supports 39R and 39L are connected in the medial section of their respective bottom members 32R and 32L and extend at an acute angle from a point along the longitudinal center line of their respective viewing conduits 15 and 16 to the respective ends of the inner partitions 38R and 38L remote from the ends thereof adjacent the image support guides 5 and 6. Mirrors as at 42R and 42L are connected by any suitable means to the face of the mirror supports 39R and 39L so that they communicate with the Z-shaped image transmitting passages 30R and 30L.

Figure 9:
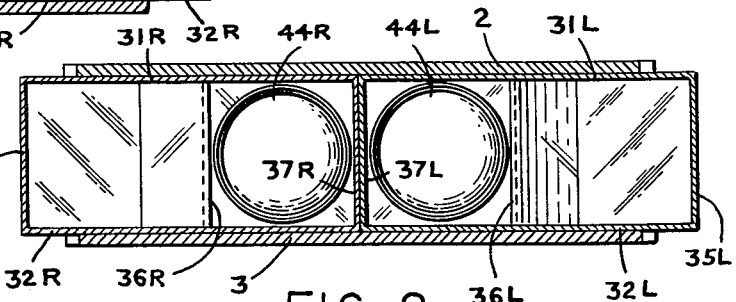
FIG. 9 is a vertical section taken on line 9–9 of FIG. 5.

By reference to FIGS. 5, 9 and 10 of the drawings the inner stop and shield members 37R and 37L are relatively foreshortened with respect to the position of the mirrors 42R and 42L. As a result there is formed crossover opening 43R and 43L in the respective right and left viewing image conduits 15 and 16 adjacent the end of the zig-zag or generally Z-shaped image transmitting passages 30R and 30L which permits images to be transmitted through said cross-over openings 43R and 43L from the Z-shaped image transmittal passage of the opposite viewing conduit.

An adjustable focusing right eye magnifying member 44R in the U-shaped front wall 36R of the right viewing conduit 15 and an adjustable focusing left eye magnifying member 44L in the U-shaped front wall 36L of the left viewing conduit 16 are in turn operatively associated with their associated mirrors 42R and 42L to view the transmitted image.

The mirrors 42R and 42L are so angled relative the Z-shaped passages 30R and 30L, the cross-over openings 43R and 43L and the respective right eye magnifying member 44R and left eye magnifying member 44L that by means of a system of mirrors and lenses, now to be described, the two dimensional image in the image holder 10 can be split into two images at different angular positions transmitted through the cross-over openings 43R and 43L through the mirrors 42R and 42L to the right eye magnifying member 44R and the left eye magnifying member 44L so that binocular viewing of these images will produce a three dimensional view of the original two dimensional image.

MIRROR AND OPTICAL SYSTEM FOR SPLITTING THE SINGLE IMAGE

Thus, referring to FIGS. 6 and 9 of the drawings the respective right image viewing conduit 15 and left image viewing conduit 16 is shown as having mirrors as at 45R and 45L mounted on the back members 33R and 33L thereof by any suitable means.

The image from the slide frame or image holder 10 is received or projected onto the mirrors 45R and 45L which produces two images which are identical to the image in the frame except that they are at different angular planes to each other. Thus the left side of the image on the mirror 45R is closer to the image in the slide frame or image holder 10 than the left side of the image on the mirror 45L and the right side of the image on the mirror 45R is further away than the right side of the image on the mirror 45L.

Thus while we have two identical images, they are at different focal lengths, and thus there is provided the required two images for creating the desired three dimensional effect obtainable with the present viewer.

This is accomplished by transmitting the split images from the mirrors 45R to coacting mirrors 46R and 46L on the angled front walls 35R and 35L remote from the back wall 33R and 33L of the Z-shaped image transmitting passages 30R and 30L.

The mirrors 46R and 46L are at an angle to the mirrors 42R and 42L. When the images are received thereon mirrors 46R and 46L will in turn transmit these split images through the cross-over openings 43R and 43L in communication with the Z-shaped passages to the mirrors 42R and 42L in the respective opposite left image viewing conduit 15 and right image viewing conduit 16.

Since as shown in FIGS. 5 and 10, the mirrors 42R and 42L are aligned and angled in the Z-shaped passages 30R and 30L for cooperative operation with the respective right eye magnifying member 44R and the left eye magnifying member 44L they can now transmit the respective split images through these magnifying members 44R and 44L for binocular viewing by the user of the optical device in accordance with the present invention. In effect the right viewing conduit delivers one split image from the mirror 45R to the left eye and the left viewing conduit delivers the other split image from the mirror 45L to the right eye.

In order to control the overall length of the optical device in accordance with the present invention a corrective lens as at 47R and 47L is provided medially in each of the Z-shaped image transmitting passages between the mirrors 45R and 46R in the right viewing conduit 15 and between mirrors 45L and 46L in the left viewing conduit 16 for the purpose of inverting the respective split images, reducing the focal length of the images being transmitted, and for magnifying the size of the images.

The image is also delivered through the right and left eye magnifying members 44R and 44L to reinvert and again magnify the images delivered to the viewer.

The turn screw adjusting assembly 25 is connected to the lower support plate 3 by spaced studs 50 and 51 which have bearings 52 and 53 for rotatably supporting an elongated turnscrew 54 therein and which lie equidistant from and respectively on opposite sides of the longitudinal centerline of the main frame or housing 1. The knurled knob 26 is in the center of the turnscrew and lies between the studs 52 and 53. The turnscrew 54 extends laterally outward on opposite sides of the studs 50 and 51 normal to the longitudinal center line where the respective threaded ends 55 and 56 are disposed in threaded engagement with the right viewing conduit bracket 57 and left viewing conduit bracket 58.

Turnscrew 54 will have right hand threads on one side and left hand threads on the opposite side so that when the knurled knob 26 is rotated back and forth in the brackets 57 and 57 the respective right and left viewing conduits 15 and 16 to which the threaded ends 55 and 56 are connected will be moved in equal increments towards and away from each other to position the right and left viewing conduits as may be required as a function of the relatively minor differences in distance between the eyes of the user of the optical device or viewer above described.

OPERATION

In operation, the two dimensional slide or image is placed in the image holder 10. The optical device as above described is grasped by the main frame or holder 1 and held up to the eyes of the user and the light 23 turned to the on position.

The right and left viewing conduits 15 and 16 are adjusted laterally to provide the proper spacing for the eyes of the user by turning the knurled knob 26.

the right eye magnifying member 44R and left eye magnifying member 44L are adjusted to focus the images.

When the respective right and left eyes of the viewer resolve the two split images into a single image the single image viewed will be in three dimensions.

Thus a relatively simple three dimensional optical viewing device is provided for use with two dimensional image forms.

It will be understood that the invention is not to be limited to the specific construction or arrangement of parts shown but that they may be widely modified within the invention defined by the claims.

What is claimed is:

1. An optical device for viewing a two dimensional image in three dimensional form comprising:
   a. holder means
   b. a right viewing box assembly and a left viewing box assembly pivotally connected in said holder means and respectively disposed on opposite sides of the longitudinal center line thereof,
   c. means connected to the respective right viewing box assembly and left viewing box assembly for moving the same towards and away from each other and towards and away from the longitudinal center line of said holder means,
   d. an image receiving means on said holder means for holding the two dimensional image therein,
   e. said right viewing box assembly having a first mirror means at one end optically associated with the image receiving means to provide a first image of the two dimensional image therein,
   f. said left viewing box assembly having a second mirror means at one end optically associated with the image receiving mean to provide a second image of the two dimensional image different from the first image,
   g. said right viewing box assembly having a right eye viewing member and said left viewing box assembly having a left eye viewing member at the respective end thereof remote from the end optically associated with the image receiving means,
   h. said right viewing box assembly having a right cross-over opening along the longitudinal center line of the holder means and inward of the right eye viewing member, and said left viewing box assembly having a left cross-over opening along the longitudinal center line of the holder means inward of the left eye viewing member and in alignment with the right cross-over opening,
   i. said right viewing box assembly having a right eye viewing mirror optically associated with the right eye viewing member disposed adjacent the right cross-over opening, and said left viewing box assembly having a left eye viewing mirror operatively associated with the left eye viewing member disposed adjacent the left cross-over opening, and
   j. coacting optical transmitting systems respectively in said right viewing box assembly and said left viewing box assembly including lens means and at least one transmitting mirror for transmitting said respective first image from said first mirror means through said cross-over opening to the left eye viewing mirror and said second image from said second mirror means through said left cross-over opening to the right eye viewing mirror so that the resolved image viewed will be in three dimensional form.

2. In an optical device as claimed in claim 1 wherein:
   a. hinge means is fixedly connected in the longitudinal center line of the holder mean a predetermined spaced distance from the image receiving means,
   b. said right viewing box assembly and said left viewing box assembly are connected to said hinge means on opposite sides of the longitudinal center line of the holder means, and
   c. said means for moving the right viewing box assembly towards and away from each other is mounted on the holder means and connected to the medial section of the respective right and left viewing box assembly.

3. In an optical device as claimed in claim 1 wherein said first mirror means and said second mirror means are disposed and maintained at different angular positions during all positions to which the respective right viewing box assembly and left viewing box assembly are moved so as to provide the respective different first image and second image to be transmitted.

4. In an optical device as claimed in claim 1 wherein,
   a. said right viewing box assembly has a first Z-shaped image transmitting passage,
   b. said left viewing box assembly has a second Z-shaped image transmitting passage, and
   c. said first Z-shaped image transmitting passage communicates with said aligned left cross-over opening in said left viewing box assembly, and said second Z-shaped image transmitting passage communicates with the aligned right cross-over opening in said right viewing box assembly.

5. In an optical device as claimed in claim 4 wherein:
   a. the first mirror means is at the beginning of the first Z-shaped image transmitting passage of the right viewing box assembly, the right eye viewing mirror is at the end of the first Z-shaped image transmitting passage, and one of said coacting optical and mirror systems lies medially in the said first Z-shaped image transmitting passage between the first mirror means and the right eye viewing mirror,
   b. the second mirror means is at the beginning of the second Z-shaped image transmitting passage of the left viewing box assembly, the left eye viewing mirror is at the end of the second Z-shaped image transmitting passage for the left viewing box assembly, and the other of said coacting optical and mirror systems lies medially in the said second Z-shaped image transmitting passage between the second mirror means and the left eye viewing mirror, and
   c. said first mirror means and said second mirror means are disposed and maintained at different angular positions during all positions of movement of said right viewing box assembly and left viewing box assembly respectively to provide respectively a first image and a different second image.

* * * * *